US010844774B2

(12) United States Patent
Martin et al.

(10) Patent No.: US 10,844,774 B2
(45) Date of Patent: Nov. 24, 2020

(54) METHOD AND SYSTEM FOR WATER COLLECTION AND USAGE ON-BOARD A VEHICLE

(71) Applicant: Ford Global Technologies, LLC, Dearborn, MI (US)

(72) Inventors: Douglas Martin, Canton, MI (US); John Rollinger, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 269 days.

(21) Appl. No.: 15/935,923

(22) Filed: Mar. 26, 2018

(65) Prior Publication Data

US 2019/0291666 A1 Sep. 26, 2019

(51) Int. Cl.

*F02B 29/04* (2006.01)
*B60R 16/08* (2006.01)
*B60H 1/32* (2006.01)
*G01C 21/34* (2006.01)
*B60S 1/68* (2006.01)
*F02N 99/00* (2010.01)
*F02M 25/03* (2006.01)
*F02D 41/14* (2006.01)

(Continued)

(52) U.S. Cl.

CPC .......... *F02B 29/0468* (2013.01); *B01D 29/50* (2013.01); *B01D 53/265* (2013.01); *B60H 1/3233* (2013.01); *B60R 16/08* (2013.01); *B60S 1/68* (2013.01); *C02F 1/001* (2013.01); *C02F 1/32* (2013.01); *F02D 41/1498* (2013.01); *F02M 25/03* (2013.01); *F02N 99/00* (2013.01); *G01C 21/3453* (2013.01); *G05D 1/0088* (2013.01); *C02F 2101/30* (2013.01); *C02F 2201/008* (2013.01); *C02F 2303/04* (2013.01); *F02D 2200/501* (2013.01)

(58) Field of Classification Search

CPC .................................................. F02B 29/0468

See application file for complete search history.

(56) References Cited

U.S. PATENT DOCUMENTS 3,638,856 A 2/1972 Dressler, Jr.
4,637,351 A 1/1987 Pakula (Continued)

FOREIGN PATENT DOCUMENTS

CN 102001777 A 4/2011
CN 202519738 U 11/2012

(Continued)

OTHER PUBLICATIONS

Bonnici, D., "What is a Fuel Cell?," WhichCar Website, Available Online at https://www.whichcar.com.au/car-advice/what-is-a-fuel-cell, Jul. 11, 2016, 8 pages.

(Continued)

*Primary Examiner* — Daniel J Colilla

(74) *Attorney, Agent, or Firm* — Geoffrey Brumbaugh; McCoy Russell LLP

(57) ABSTRACT

Methods and systems are provided for optimizing collection, usage, and processing of water on-board a vehicle. Water is harvested from various locations of the vehicle including from engine operation, surface condensation, and via dehumidification. Water is processed differently based on the source of the water as well as the intended use.

14 Claims, 4 Drawing Sheets

200
260
202
201
Display 280
Engine 110
Int. Man. 282
Fuel sys. 284
CAC 216
Cylinders 30
EGR 215
HVAC 208
Evaporator 212
Condensor 210
Compressor 214
Extractor 290
Evaporator 217
Condensor 218
Electric machine 219
Vehicle Cabin 204
Vehicle Surface 206
220
222
224
230
232
234
262
264
240
242
244
246
250
252
254
270
Common reservoir 268
168
266
267
276
272
274
To injectors, sprayers, and nozzles
Potable water reservoir 278
CONTROLLER 190

(51) Int. Cl.

| | |
|---|---|
| ***B01D 53/26*** | (2006.01) |
| ***C02F 1/00*** | (2006.01) |
| ***C02F 1/32*** | (2006.01) |
| ***B01D 29/50*** | (2006.01) |
| ***G05D 1/00*** | (2006.01) |
| *C02F 101/30* | (2006.01) |

(56) References Cited

U.S. PATENT DOCUMENTS

| | | | | |
|---|---|---|---|---|
| 5,261,254 | A * | 11/1993 | Cattane | B60H 3/024 62/271 |
| 5,407,456 | A | 4/1995 | Tseng | |
| 5,435,151 | A | 7/1995 | Han | |
| 5,669,986 | A | 9/1997 | Buchanan, Jr. et al. | |
| 5,687,706 | A | 11/1997 | Goswami et al. | |
| 6,044,856 | A | 4/2000 | Cano | |
| 6,058,718 | A | 5/2000 | Forsberg et al. | |
| 6,581,375 | B2 | 6/2003 | Jagtoyen et al. | |
| 6,724,985 | B2 | 4/2004 | Matsunaga et al. | |
| 6,727,013 | B2 | 4/2004 | Wheat et al. | |
| 7,368,193 | B2 | 5/2008 | Osborne et al. | |
| 7,648,185 | B2 | 1/2010 | Beigel et al. | |
| 8,021,542 | B2 | 9/2011 | Kirts | |
| 8,900,766 | B2 | 12/2014 | Rogahn et al. | |
| 9,328,940 | B2 | 5/2016 | Satoh et al. | |
| 9,540,107 | B2 | 1/2017 | Boodaghians et al. | |
| 10,012,133 | B1 * | 7/2018 | Martin | F01P 3/20 |
| 10,156,214 | B2 * | 12/2018 | Kanzaki | F02M 26/09 |
| 2004/0040322 | A1 | 3/2004 | Engel et al. | |
| 2007/0006571 | A1 | 1/2007 | Vetrovec | |
| 2013/0206266 | A1 | 8/2013 | Stenhouse | |
| 2014/0217006 | A1 | 8/2014 | Spelter et al. | |
| 2016/0083936 | A1 | 3/2016 | Martin et al. | |
| 2016/0123283 | A1 * | 5/2016 | Newman | F02M 35/10222 123/572 |
| 2016/0326992 | A1 * | 11/2016 | Keating | F02M 26/22 |
| 2018/0017025 | A1 * | 1/2018 | Bailey | F02M 26/35 |
| 2019/0145362 | A1 * | 5/2019 | Dudar | F02M 35/10229 |

FOREIGN PATENT DOCUMENTS

| | | | | | |
|---|---|---|---|---|---|
| CN | 104417638 | A | | 3/2015 | |
| GB | 2494181 | A | | 3/2013 | |
| JP | 2004176691 | A | * | 6/2004 | F02B 29/0468 |
| JP | 2013221441 | A | * | 10/2013 | |
| JP | 2017214833 | A | * | 12/2017 | F02M 25/03 |
| KR | 2018009124 | A | * | 1/2018 | F02M 35/10222 |

OTHER PUBLICATIONS

Bionnici, D.,"Ford engineers tap into the future," WhichCar Website, Available Online at https://www.whichcar.com.au/car-news/ford-engineers-tap-into-the-future, Sep. 14, 2016, 9 pages.

Dudar, A. et al., "Vehicle-To-Trailer Transfer of Harvested and Purified Water," U.S. Appl. No. 15/417,793, filed Jan. 27, 2017, 27 pages.

Martin, D. et al., "Method and System for Maintaining an Engine Coolant Level," U.S. Appl. No. 15/431,187, filed Feb. 13, 2017, 43 pages.

Martin, D. et al., "Method and System for Engine Water Injection," U.S. Appl. No. 15/465,465, filed Mar. 21, 2017, 74 pages.

Dudar, A. et al., "Method and System for a Humidity Sensor in a Vehicle," U.S. Appl. No. 15/474,386, filed Mar. 30, 2017, 23 pages.

Daniel, J. et al., "Vehicle Humidifier System," U.S. Appl. No. 15/711,956, filed Sep. 21, 2017, 15 pages.

Martin, D. et al., "Method and System for Water Usage On-Board a Vehicle," U.S. Appl. No. 15/910,737, 67 pages.

* cited by examiner

METHOD AND SYSTEM FOR WATER COLLECTION AND USAGE ON-BOARD A VEHICLE

FIELD

The present description relates generally to methods and systems for controlling the collection, processing, and usage of water on-board a vehicle.

BACKGROUND/SUMMARY

Water may be used (e.g., injected, sprayed, etc.) at a plurality of locations in a vehicle system to address a wide range of issues. For example, water may be injected into an engine intake manifold to humidify the air charge, or into an exhaust manifold to purify the exhaust gas. As another example, water may be injected directly into a combustion chamber for knock control or temperature control. In still other examples, water may be sprayed onto the surface of a vehicle component to clean or cool the component (such as onto a windscreen, a camera lens, a vehicle body, etc.), or to remove particulate matter. Further still, the water may be processed (e.g., filtered or distilled) to provide potable water that can be consumed by a vehicle occupant.

The disbursed water may be sourced from a water harvesting system present on-board the vehicle. For example, water generated as a side product during vehicle operation, such as during fuel combustion in a cylinder, during operation of an air-conditioning system, due to condensation on a vehicle surface, etc., may be harvested, processed, and stored by the water harvesting system. One example of a water harvesting system available on-board a vehicle is shown by Martin et al in US20160083936. Additionally or optionally, the water generating system may include an electric water generator that uses electric power to harvest water from ambient humidity. An example of a water generating system coupled to a vehicle is shown by Engel et al. in US20040040322.

The inventors herein have recognized that the benefits of water usage may be limited by the availability of water on-board the vehicle. As such, there may be additional opportunities for harvesting water during vehicle operation that go untapped. It may also be difficult to optimize water usage in view of the different water usage locations as well as the tolerance of the various usages to the water quality. For example, water of poor quality may be unsuitable for injection into a cylinder, but may be usable for cleaning a windshield or for spraying onto a hot vehicle component. If the water is discarded due to poor quality, there may not be sufficient water available for cooling the vehicle component. In the other hand, if the water of poor quality is retained, and used for injection into a cylinder, combustion stability and performance may be compromised.

In one example, the above issues may be addressed by a method for a vehicle comprising: selectively operating a pump during an engine start to draw condensate from an intake manifold into a water reservoir of a water generation system on-board the vehicle. The condensate collected from the intake manifold during the engine start may be processed differently from condensate collected from a vehicle air-conditioning (AC) unit during engine operation. In addition, the intake manifold condensate may be used at a different location than the AC condensate. In this way, water collection, processing, and usage may be optimized.

As one example, a vehicle may be configured with a water generation system for harvesting water generated on-board the vehicle, as well as water trapped in ambient air. The water generation system may include a water collector configured to collect condensate from an AC unit during engine operation. The AC condensate, collected from a condenser of the AC unit, may be stored in a first water reservoir. The water generation system may include another pump-driven collector configured to collect condensate from the bottom of an intake manifold (IM) during an engine start, after a prolonged engine soak (such as a longer than threshold engine soak at cold ambient conditions). The IM condensate may be stored on a second water reservoir. In addition to storing the condensates in different locations, the condensates may be processed to different degrees and used for different purposes on-board the vehicle. For example, the IM condensate may be filtered to a higher degree (than the AC condensate), and may then be used for in-cylinder injection during engine knock control. This is because the IM condensate may have some fuel contamination due to it being collected from the intake manifold. Therefore, it is preferentially used in a location where the contaminating fuel can be burned without causing engine performance issues. The added level of filtration ensures that the water injected into the cylinder is free from particulates that can cause combustion instability. In comparison, the AC condensate may be filtered to a lower degree and may be used for spraying onto tires and brake pads for particulate suppression.

In this way, water usage may be better coordinated with water collection and water processing events. By collecting water condensing an intake manifold during an engine cold-start, water collection opportunities are expanded. The technical effect of collecting water from different sources at different reservoirs, and processing them differently based on the source of the water and the intended use, is that a higher vehicle (or engine) efficiency benefit per unit of water can be achieved. For example, the size, lifetime, and cleaning requirements of processing components (e.g., filters) associated with each water line can be optimized according to the needs of each use, rather than requiring all collected water to be processed to a maximum purification requirement. The customized processing also reduces power consumption by the water generation system, improving overall vehicle fuel economy. By assigning a priority value to water injection usages based on current operating conditions, as well as water levels (current and predicted) in a water reservoir, and by injecting water based on the priority values, water usage is improved. By diagnosing the water generation system available on-board a vehicle based on changes in water level during water collection and usage events, system leakage can be identified and addressed in a timely manner. By adjusting the water usage based on ambient temperature, such as by purging the water in water lines of the water generation system during extended cold conditions, freezing of water in the lines is reduced. As a result, damage to the system that could have been incurred from frozen water in the lines is reduced. Overall, water usage benefits on a vehicle can be extended over a wider range of operating conditions and over a larger portion of a drive cycle.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
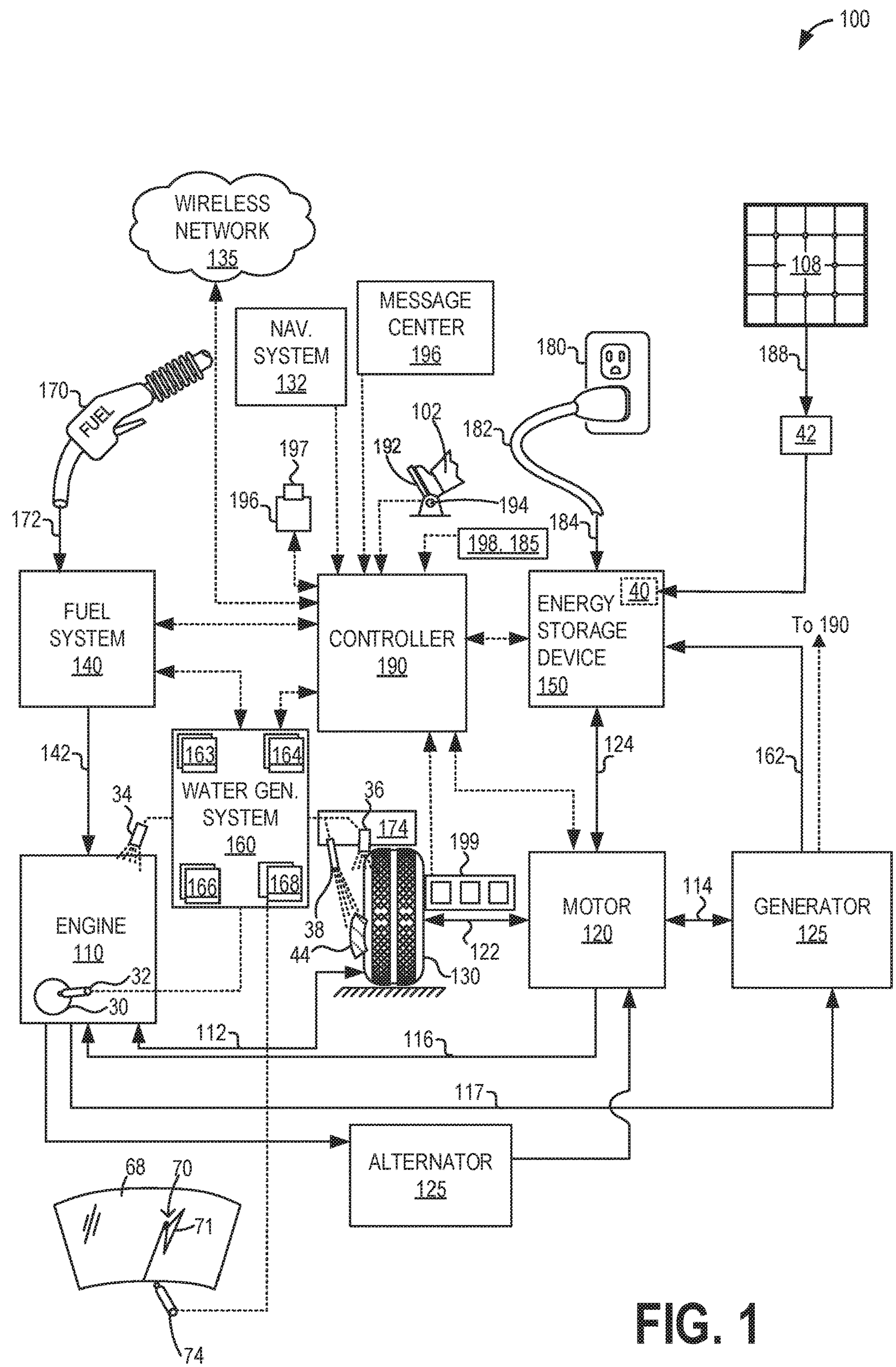
FIG. 1 shows a schematic diagram of a vehicle system including an on-board water generation system.

The following description relates to systems and methods for coordinating the collection, processing, and use of water on-board a vehicle, such as the vehicle system of FIG. 1. A water generation system, such as the system of FIG. 2, may be configured to harvest and collect water generated on-board the vehicle during vehicle operation, such as during cylinder combustion, air conditioner operation, ambient water condensation, etc. In addition, the water generation system may be configured to use electrical power to harvest water from ambient air. A controller may be configured to perform a control routine, such as the example routine of FIG. 3, to coordinate the collection and processing of water from various locations of the vehicle. Leakage of water from a water reservoir may be inferred based on sensed changes in a water level of the reservoir. An example water processing operation is shown at FIG. 4. In this way, the vehicle performance benefits of water use can be extended.

FIG. 1 illustrates an example vehicle propulsion system 100. Vehicle propulsion system 100 includes a motor 120 and a fuel burning engine 110. As a non-limiting example, engine 110 is an internal combustion engine and motor 120 is an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (e.g., set to a deactivated state) where combustion of fuel at the engine is discontinued. For example, under select operating conditions, motor 120 may propel the vehicle via drive wheel 130 as indicated by arrow 122 while engine 110 is deactivated (herein also referred to as an electric-only mode).

During other operating conditions, engine 110 may be set to a deactivated state (as described above) while motor 120 may be operated to charge an energy storage device 150. For example, motor 120 may receive wheel torque from drive wheel 130, as indicated by arrow 122, and may convert the kinetic energy of the vehicle to electrical energy for storage at energy storage device 150, as indicated by an arrow 124. This operation may be referred to as regenerative braking of the vehicle. Thus, motor 120 may function as a generator in some examples. However, in other examples, a generator 125 may instead receive wheel torque from drive wheel 130 and may convert the kinetic energy of the vehicle to electrical energy for storage at energy storage device 150, as indicated by an arrow 114. As an additional example, motor 120 may use energy stored at energy storage device 150 to crank engine 110 in a starting operation, as indicated by an arrow 116. Herein, the energy storage device 150 is a high voltage storage device, such as a system battery coupled to a 48V electrical architecture of the vehicle. In one example, the system battery is a Lithium ion battery.

During still other operating conditions, engine 110 may be operated by combusting fuel received from a fuel system 140, as indicated by an arrow 142. For example, engine 110 may be operated to propel the vehicle via drive wheel 130, as indicated by an arrow 112, while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle system 100 may be configured as a series type vehicle propulsion system, whereby the engine does not directly propel the drive wheels. Rather, engine 110 may be operated to power motor 120, which may in turn propel the vehicle via drive wheel 130, as indicated by arrow 122. For example, during select operating conditions, engine 110 may drive generator 125, as indicated by arrow 117, which may in turn supply electrical energy to one or more of motor 120, as indicated by an arrow 114, or energy storage device 150, as indicated by arrow 162. As another example, engine 110 may be operated to drive motor 120, which may in turn function as a generator to convert the engine output to electrical energy. The electrical energy may be stored at energy storage device 150 for later use by the motor, for example.

Fuel system 140 may include one or more fuel tanks for storing fuel on-board the vehicle. For example, fuel tank may store one or more liquid fuels, including but not limited to: gasoline, diesel, and alcohol fuels. In some examples, the fuel may be stored on-board the vehicle as a blend of two or more different fuels. For example, fuel tank may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to generate electricity by operating alternator 126, said electricity used to directly power motor 120, or to recharge energy storage device 150.

In one example, alternator 126 is a smart alternator. As elaborated with reference to FIGS. 3-4, smart alternator may be configured to generate large amounts of power during engine braking, such as during a deceleration event. This power may be used to operate a water generation system 160, the power then stored in the form of harvested water in a water reservoir 168 on-board the vehicle.

In some embodiments, energy storage device 150 may be configured to store electrical energy that may be supplied to other electrical loads residing on-board the vehicle (other than the motor), including a cabin heating and air conditioning system, engine starting system, headlights, cabin audio and video systems, etc. As a non-limiting example, energy storage device 150 may include one or more batteries and/or capacitors.

Propulsion system 100 further includes a water generation system 160 configured to generate and store water on-board the vehicle. Water generation system 160 may include an electric motor for harvesting water from humidity in ambient air. Additionally, water generation system may capture water vapor and condensation occurring on the vehicle system. The captured condensation may be generated (or emitted) as a by-product of various vehicle operations, such as condensate trapped at one or more heat exchangers of the vehicle system. As an example, where engine 110 is a boosted engine including an intake compressor, condensate may be generated at a charge air cooler coupled to the engine intake downstream of the compressor during boosted engine operation. As another example, where the vehicle includes an air-conditioning system, condensate may be generated at a condenser of the air-conditioning system during a vehicle cabin cooling operation. As yet another example, water may be generated by a fuel separator coupled to fuel system 140. Still other vehicle components whose operation can generate condensate include motor 120, a fuel cell, an electric motor cooling system, etc.

Figure 2:
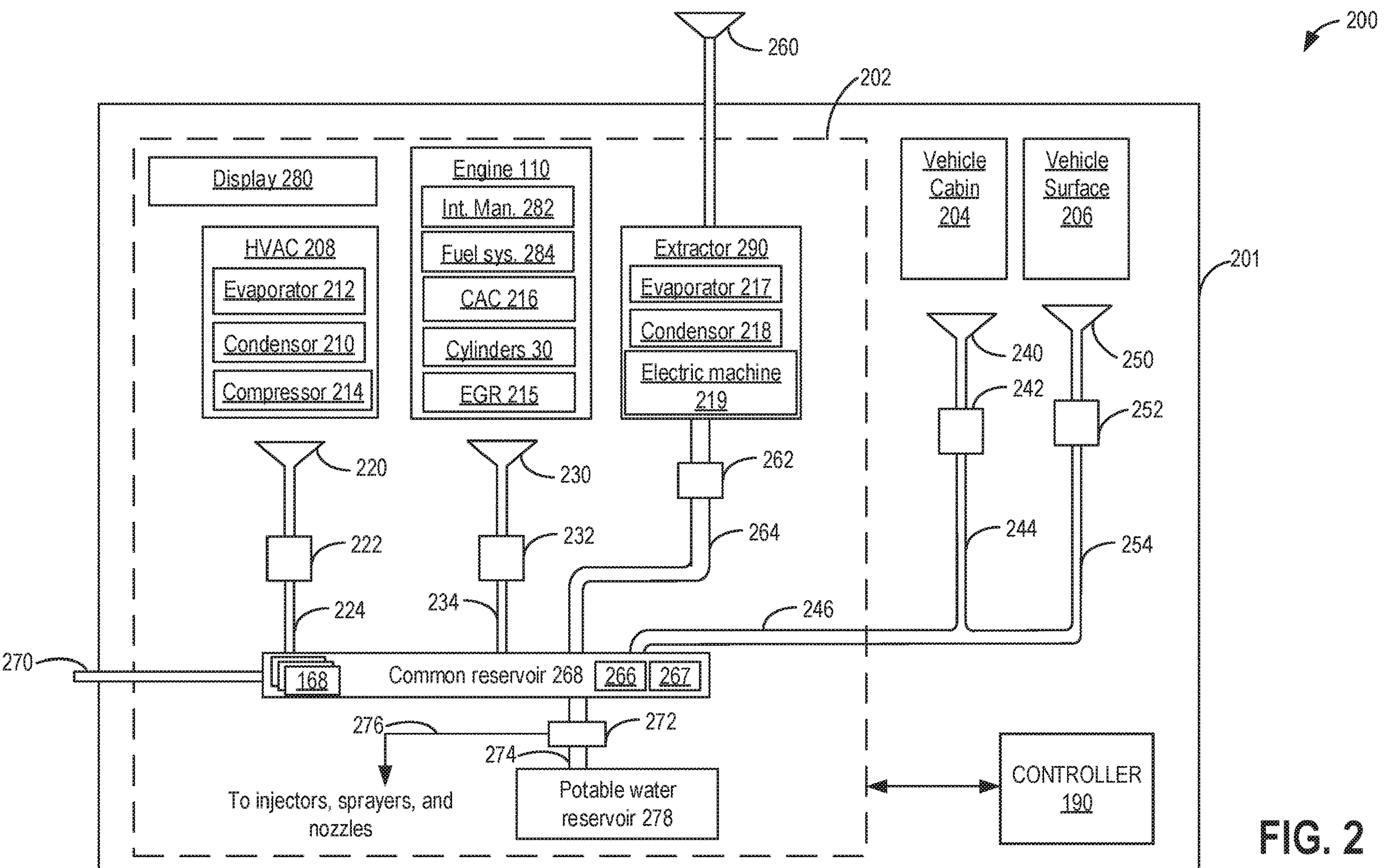
FIG. 2 shows an example embodiment of an on-board water generation system that may be included in the vehicle system of FIG. 1.

As elaborated with reference to FIG. 2, water may be generated and transported to a reservoir where the water is processed before being used for various applications on-board the vehicle system. Accordingly, water generation system may include various components such as one or more pumps 163, one or more valves 164 (such as flow control valves, check valves, dispensing valves, etc.), one or more water processing devices (such as filters, distillers, ion-exchangers, etc.) 166, and one or more reservoirs 168. Still other components may be included in water generation system 160 without departing from the scope of this invention.

The harvested water may be used for spraying onto or injected into various vehicle components based on operating conditions. As one example, water may be injected into an engine cylinder 30 via a water injector 32. The water injector 32 may inject water directly into the engine cylinder 30, for example, responsive to an indication of engine knock. Additionally or optionally, water injector 32 may inject water into an intake manifold of engine 110. For example, water may be injected into the intake manifold responsive to a demand for engine dilution, such as when combustion stability is limited.

As another example, water may be sprayed onto the engine, such as onto a cylinder head, by cylinder head nozzle 34. Water may be sprayed onto the cylinder head for engine temperature control. For example, when an engine cooling system fails, the cylinder head temperature may exceed an engine shutdown temperature before round-robin fuel injector cuts can limit the temperature increase at the engine. Responsive to the cylinder head temperature rise (e.g., a higher than threshold temperature or a higher than threshold rate of rise in temperature), a pump of water generation system 160 may be operated to spray water onto the cylinder head via cylinder head nozzle 34. Operation of the nozzle may generate a mist that limits or slows down the rapid rise in temperature at the cylinder head. The amount of water dispensed may be function of the temperature rise.

As another example, water pumped from water generation system 160 may be supplied to a windshield wiper system that enables cleaning of a vehicle windshield 68. Windshield 68 may be a front or rear windshield of the vehicle. The windshield wiper system includes at least one windshield wiper 70 operated by a wiper motor (not shown). In response to an operator demand, and based on input from controller 190, the wiper motor may be energized causing wiper 70 to make multiple sweeping cycles known as wipes or sweeps over windshield 68. The wipes or sweeps enable wiper blade 71 to remove moisture, debris, and foreign particles from the surface of windshield 68. While wiper blade 71 is sweeping, based on request from a vehicle operator, controller 190 may intermittently inject or squirt a wiper fluid (herein also referred to as a washer fluid) onto the windshield via wiper injector 74. In one example, the wiper fluid includes water sources from a reservoir of water generation system 160. Alternatively, washer fluid may be stored in a wiper fluid reservoir from where it is delivered to the windshield, and water may be provided to the reservoir from water generation system 160, such as to top off the washer fluid. The washer fluid stored in the reservoir may include a combination of water and alcohol, such as methanol or isopropanol.

As another example, water may be sprayed onto the engine, such as onto a cylinder head, by cylinder head nozzle 34. Water may be sprayed onto the cylinder head for engine temperature control. For example, when an engine cooling system fails, the cylinder head temperature may exceed an engine shutdown temperature before round-robin fuel injector cuts can limit the temperature increase at the engine. Responsive to the cylinder head temperature rise (e.g., a higher than threshold temperature or a higher than threshold rate of rise in temperature), a pump of water generation system 160 may be operated to spray water onto the cylinder head via cylinder head nozzle 34. Operation of the nozzle may generate a mist that limits or slows down the rapid rise in temperature at the cylinder head. The amount of water dispensed may be a function of the temperature rise. The nozzle may be optimized to spread the spray over a maximum area of the cylinder head, or optimized to concentrate the spray to a localized hot area on the head, as dictated by the heat pattern generated in the cylinder head during cooling system degradation. The individual spray pattern can be selected by the design of a nozzle adapted from fuel injectors whose spray pattern is known. For nozzles passing water with particulates, a single larger hole for the nozzle may be used to pass the dirt and preclude nozzle contamination or blockage.

Likewise, water may be sprayed onto brake pads 44 coupled to drive wheel 130 via brake nozzle 38. Brake nozzle 38 may also be coupled to undercarriage 174, at a location above drive wheel 130, and adjacent to tire nozzle 36. Water may be sprayed by brake nozzle 38 onto or towards the brake pads 44 to enable particulate suppression. Specifically, the sprayed water coagulates fine particulates from the air as they leave the brake pad. For example, tire nozzle 38 may be operated when vehicle speed is above a threshold, such as above 3 mph. In addition, operation of the tire nozzle 38 may be determined as a function of the tire temperature or the ground temperature. As the ground temperature, and therefore the tire temperature rises, tire water spraying may be increased. Alternatively, water may be sprayed by brake nozzle 38 into the air at a location where brake particulates exit the brake pads and associated brake motors, such as behind the rear lower portion of the tires where it departs the ground during rotation. Since brake particulate generation increases during braking events, brake nozzle 38 may be selectively operated during braking maneuvers of the vehicle. For example, brake nozzle 38 may be operated when vehicle speed is below an upper threshold, but above a lower threshold, such as between 3 and 55 mph. This allows the particulates released from the brake pads 44 into the air to be coagulated in the sprayed mist, and fall to the ground instead of remaining air-borne.

Further still, as elaborated with reference to FIG. 2, water harvested by the water generation system 160 may be processed to make potable water (and ice) that is available on-board the vehicle to a vehicle operator.

Vehicle system 100 may also include one or more solar cells 108, operative to convert incident solar radiation into electrical energy. The solar cells 108 may be electrically coupled to a solar battery 40 via a charge controller 42. Solar cells 108 and charge controller 42 are operative to supply electrical current for charging solar battery 40. In this example, solar battery 40 is housed within and electrically coupled to energy storage device 150, but in other configurations, solar battery 40 may be electrically coupled to energy storage device 150 while being housed separately. Solar battery 40 may thus be configured to provide or receive charge from energy storage device 150, depending on engine operating conditions, charge status, and battery requirement(s). In still other configurations, solar battery 40 may be both physically and electrically isolated from energy storage device 150. In some examples, solar battery 40 may be configured to independently supply charge directly to vehicle actuators and devices. In still further examples, charge controller 42 may be used to directly supply power to vehicle actuators and devices without requiring charge to first be stored in solar battery 40.

Solar cells 108 may be mounted on any convenient exterior surface of the vehicle, for example a vehicle roof, hood, trunk, etc. However, solar cells 108 may additionally or alternatively be mounted on the interior of the vehicle, such as on a dashboard or other passenger compartment surface in proximity to a window or interior light bulb. In general, the solar cells are operative to convert solar radiation incident thereon into electrical energy. In some embodiments, solar cells 108 may comprise a series of photovoltaic cells formed from an amorphous semi-conductor material, such as silicon. Additionally, individual photovoltaic cells may be interconnected so as to provide a constant flow of electrical energy to a common output cable 188, which electrically couples solar cells 108 to charge controller 42 and solar battery 40. In this way, solar cells 108 may generate electrical energy with which to propel the vehicle or power one or more additional vehicle actuators and devices, including components (e.g., an electric motor and/or pumps) of water generation system 160.

Control system 190 may communicate with one or more of engine 110, motor 120, fuel system 140, energy storage device 150, and alternator 125. Control system 190 may receive sensory feedback information from one or more of engine 110, motor 120, fuel system 140, energy storage device 150, and alternator 125. Further, control system 190 may send control signals to one or more of engine 110, motor 120, fuel system 140, energy storage device 150, and alternator 125 responsive to this sensory feedback. Control system 190 may receive an indication of an operator requested output of the vehicle propulsion system from a vehicle operator 102. For example, control system 190 may receive sensory feedback from pedal position (PP) sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle, whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected from the power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it will be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel system 140 may be configured to store the fuel received from fuel dispensing device 170 until it is supplied to engine 110 for combustion. In some embodiments, control system 190 may receive an indication of the level of fuel stored at a fuel tank of the fuel system via a fuel level sensor. The level of fuel stored in the fuel system 140 (e.g., as identified by the fuel level sensor) may be communicated to the vehicle operator, for example, via a fuel gauge or indication in a vehicle instrument panel 196. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, in response to the vehicle operator actuating refueling button 197, a fuel tank in the vehicle may be depressurized so that refueling may be performed. As another example, a water level in a water reservoir 168 of the water generation system 160 may be displayed to a vehicle operator via the instrument panel 196. As elaborated with reference to FIG. 2, the fuel system may further include a fuel separator that enables water to be extracted from fuel in the fuel tank, or out of the fuel on its way to the fuel tank. In one example, water may be extracted from an ethanol-based fuel (such as an ethanol-gasoline blended fuel).

The vehicle system 100 may also include one or more sensors such as an ambient temperature or humidity sensor 198, an engine temperature sensor 185, and a vehicle speed sensor 199. In one example, engine temperature sensor 185 is an engine coolant temperature (ECT) sensor wherein the engine temperature is inferred from the engine coolant temperature. In another example, engine temperature sensor 185 is a cylinder head temperature (CHT) sensor wherein the engine temperature is inferred from the cylinder head temperature. Still other sensors may be coupled to the vehicle system, such as water level sensors, as discussed at FIG. 2.

Control system 190 (herein also referred to as controller 190) may be communicatively coupled to other vehicles or infrastructures using various appropriate communications technologies. For example, control system 190 may be coupled to other vehicles or infrastructures via a wireless network 135, which may comprise Wi-Fi, Bluetooth, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. Information exchanged between vehicles can be either directly communicated between vehicles or can be multi-hop. In some examples, longer range communications (e.g. WiMax) may be used in place of or in conjunction with V2V or V2I2V to extend the coverage area by a few miles. In still other examples, vehicle control system 190 may be communicatively coupled to other vehicles or infrastructures via wireless network 135 and the internet (e.g. the cloud).

Vehicle system 100 may also include an on-board navigation system 132, such as a Global Positioning System (GPS), that an operator of the vehicle may interact with. The navigation system 132 may include one or more location sensors for assisting in estimating vehicle speed, vehicle altitude, vehicle position/location, etc. This information may also be used to infer engine operating parameters, such as local barometric pressure. In additional, the information may be used for travel route planning including weather, road, and traffic conditions along a planned route of travel. As discussed above, control system 190 may be further configured to receive information via the internet or other communication networks. Information received from the GPS may be cross-referenced to information available via the internet to determine local weather conditions, local vehicle regulations, etc. In this way, the control system 190 is configured to receive navigational input from navigation system 135.

The controller 190 receives signals from the various sensors of FIG. 1 and employs the various actuators of FIG. 1 to adjust engine operation based on the received signals and instructions stored on a memory of the controller. For example, based on signals received from a water level sensor of the fuel system, the controller may send a signal to operate the water generation system to generate water. As another example, based on signals received from a knock sensor of the engine, the controller may send a signal to operate a injector to deliver water into a knocking engine cylinder.

Turning now to FIG. 2, a detailed embodiment 200 is shown for a water generation system 202 coupled in a vehicle 201 configured for on-road propulsion. The embodiment enables water to be harvested from one or more components of the vehicle, as well as from ambient humidity. Components previously introduced in FIG. 1 are numbered the same and are not reintroduced for reasons of brevity. In one example, water generation system 202 includes water generation system 160 of FIG. 1, and vehicle 201 includes vehicle system 100 of FIG. 1.

Water generation system 202 is coupled to various components of vehicle 201. For example, water generation system 202 is coupled to a heating, ventilation, and air-conditioning (HVAC) system 208. HVAC system 208 is configured to adjust a temperature of vehicle cabin 204 based on input from a vehicle occupant. HVAC system 208 includes a condenser 210, an evaporator 212, and a compressor 214. The condenser 210 is essentially a heat-exchanger disposed outside of a passenger compartment of the vehicle while the evaporator is essentially a heat-exchanger disposed within the passenger compartment of the vehicle. The compressor 214 may be driven by the engine 110, such as by the use of an auxiliary drive belt off a crankshaft (not shown), or an auxiliary drive belt off an electric machine (such as electric motor 120 of the hybrid driveline of FIG. 1), or by having a separate compressor motor (not shown). The compressor motor may be provided energy from an on-board energy storage device, which may be a high voltage traction battery or from a 12 volt battery (not shown).

Other components that may be included in HVAC system 208, but are not shown, include a pressure regulator, an expansion valve, an accumulator, a receiver, a desiccant filter, or the like. A series of ducts may route conditioned air from the evaporator 212 into the vehicle cabin 204. Optionally, a fan (not shown) may be employed adjacent the condenser 210 to aid in improved airflow across the heat-exchangers, and/or a fan may be disposed within the series of ducts to aid in airflow across the heat-exchangers.

As HVAC system 208 runs, water may condense on the condenser 210 and the evaporator 212. Condensation is generally known as a change in the state of water vapor to liquid water when in contact with any surface. Generally when the HVAC system 208 is used to cool vehicle cabin 204, condensation may occur at least on the condenser 210 which is located outside of vehicle cabin 204 and is in fluid contact with the ambient environment. The water that condenses on condenser 210 is from water vapor formerly held within air surrounding the condenser.

Water generation system 202 may include an HVAC water collector 220 located near condenser 210 and configured to collect condensed water from the condenser 208. The collector may be located below the condenser 208 (or at a location near a bottom surface of the condenser 208) so that water may be transferred from the condenser 210 to the HVAC water collector 220 using gravity. The HVAC collector 220 may be fluidly connected to one or more HVAC water processing components 222 including an HVAC water collection valve. Other water processing components 222 coupled to HVAC water line 224 may include a collection pump, a collection filter, etc.

For example, the collection valve may be a three-way valve, or a series of T-shaped valves that can be electrically actuated. By adjusting the operation of the collection valve, water may be diverted from HVAC water collector 220 to a common water reservoir 268. In some embodiments, water collected from the HVAC system may be initially stored in one of a plurality of water reservoirs 168, such as a water reservoir dedicated to collecting water from the HVAC system. The water may be treated and processed locally in the dedicated water reservoir before being transferred into common water reservoir 268 where the water collected from the HVAC system is merged with water collected from other sources.

As another example, HVAC water line 224 may include a filter with a mesh screen that is used for the separation of solids (such as small particulates) from the collected fluid by interposing a medium through which the fluid can pass but not solids larger than the mesh sizing. The filter may also be a chemical or ultraviolet filtration device which may be used to filter out undesirable bacteria, organic carbons, or the like. The filter may be included in the HVAC water line 224 after or before the collection valve. Similarly, HVAC water line 224 may include a pump located before or after the filter. The system may also operate without a filter or pump, or with multiple filters and pumps along HVAC water line 224 to provide a desired degree of filtration, to move water, or to provide pressure where desired.

As will be elaborated herein, each of the different water lines may include a different set of water processing components for processing water differently based on the source of the water as well as the intended use of the water. For example, if the water harvested from the HVAC system 208 is used primarily for injecting onto the cylinder head (such as via cylinder head nozzle 34 of FIG. 1), onto tires (such as via tire nozzle 36) and/or onto brake pads (such as via brake nozzle 38 of FIG. 1), a lower degree of water processing may be required. As an example, a filter having a larger mesh size, or no filtering may be included in HVAC water line 224. In comparison, if the water harvested from the HVAC system 208 is used primarily for injecting into the cylinder (such as via water injector 32 of FIG. 1), a higher degree of water processing may be required. As an example, a filter having a smaller mesh size may be included in HVAC water line 224.

In some examples, a vehicle controller may actively operate the HVAC system 208 to generate condensed water even when the vehicle 100 is in a key-off state. HVAC system 208 may be operated based on inputs from the water generation system 202 (such as based on a water level in reservoir 268) so as to generate condensed water. In one example, water is generated by operating the HVAC system while the vehicle 100 is plugged into an external power source to recharge a system energy storage device. In another example, water is generated by operating the HVAC system while the vehicle is operating, such as by increasing the load on the condenser 210.

Water generation system 202 may also collect water condensed at engine 110. In particular, engine water collector 230 may be coupled to an engine block at a location from where water generated by engine cylinders 30 (due to cylinder combustion), charge air cooler 216 (due to boosted engine operation), and an EGR cooler (coupled to an EGR system 215) can be collected. The collector 230 may be located below the CAC 216 (or at a location near a bottom surface of the CAC 216) so that water may be transferred from the CAC 216, and any other engine heat exchangers, to the engine water collector 230 using gravity.

Water may also be collected from an engine intake manifold 282. In particular, water may condense in the intake manifold 282 after a soak. The amount of condensate collected may be more as a duration of engine shut-down increases, as well as if the ambient temperature during the shutdown is cold (e.g., lower than a threshold temperature). The intake manifold condensation is primarily accumulated at an engine start, the condensate collecting at the bottom of the intake manifold. As elaborated at FIG. 3, upon engine start-up, during cranking, or just before cylinder combustion is resumed (such as while engine speed is at or below 50 RPM), the intake manifold condensation may be pumped out via operation of a water generation system pump. The condensation may be pumped out by a tube leading to a reservoir. The reservoir may a common reservoir. Alternatively, the water may be directed to a reservoir dedicated to injection into the engine. Since fuel can be present in the manifold, a fraction of this water may have fuel mixed with it. Therefore in one example, the water collected as intake manifold condensation is only used (or primarily used) for injection into the engine.

Water may also be collected from a fuel system 282 via a fuel separator. The fuel separator may be in the form of a membrane or a mass centrifugal separator, for example. Water may be separated from the fuel, such as from a gasoline-ethanol fuel blend, while the fuel is stored in a fuel tank, or as the fuel is dispensed into the fuel tank during a tank refilling event. In the case of a gasoline-ethanol fuel blend, the amount of water that can be extracted increases as the ethanol content of the fuel blend increases. As with the water collected from the intake manifold condensation, water harvested from the fuel system may contain a small amount (e.g., residual amount) of fuel. Therefore, the water may be collected and processed into a special reservoir dedicated to water injection to the engine, such as a reservoir made of materials that are resistant to degradation by fuel, and not made for potable water.

The engine collector 230 may be fluidly connected to one or more engine water processing components 232 including an engine water collection valve, a collection pump, a collection filter, etc. These components may be similar to those described earlier with reference to the HVAC system 208. The collected water is then delivered along engine water line 234 to the common reservoir 268. For example, water collected from the engine 110 may be initially stored in one of a plurality of water reservoirs 168, such as a water reservoir dedicated to collecting water from the engine system. The water may be treated and processed locally in the dedicated water reservoir before being transferred into common water reservoir 268 where the water collected from the engine system is merged with water collected from the other sources.

Water generation system 202 may also collect water condensed on the vehicle surface 206 as well as any water condensed in the vehicle cabin 202. For example, surface water collector 250 may be coupled to catch channels incorporated into one or more of the side of the windshield, the windshield column, the rubber sealing bordering the windshield, an outer edge of a side door, the space between the side door and the windshield column. At least some of these catch channels may include a front edge which protrudes outwardly from the external surface of the vehicle to enhance water catching. The catch channels prevent the water from going inside the vehicle cabin. Via these channels, water condensed on the surface of the vehicle, water from precipitation such as rain, or other water blown across the vehicle's surface by the force of wind resulting from the travel of the vehicle can be harvested at the surface water collector 250.

Similarly, cabin water collector 240 may be coupled to catch channels incorporated inside the vehicle cabin, such along an inner edge of a side door. Via these channels, water condensed on the inner surface of the vehicle, such as due to ambient humidity and from cabin occupants can be harvested at the cabin water collector 240.

Like the HVAC and engine water collectors 220, 230, the surface water collector 250 and the cabin water collector 240 may be fluidly connected to one or more water processing components 252 and 242, respectively, including corresponding water collection valves, collection pumps, collection filters, etc. These components may be similar to those described earlier with reference to the HVAC system 208 and engine system 110. The collected water is then delivered along surface water line 254 and cabin water line 244, respectively, to the common reservoir 268. For example, water collected from each of the vehicle surface 206 and the vehicle cabin 204 may be initially stored in distinct one of a plurality of water reservoirs 168. In the depicted example, water lines 244, 254 merge into a common water line 246 upstream of the reservoir although in other examples, the water lines may not merge. The water may be treated and processed locally in the dedicated water reservoirs before being transferred into common water reservoir 268 where the water collected from the engine system is merged with water collected from the other sources.

In addition to above-mentioned collectors that harvest water passively, water may also be generated actively via operation of an extractor 290 that is capable of extracting water from ambient air. In particular, extractor 290 may be configured to draw in ambient air (such as from outside the vehicle or from within the vehicle cabin) through a filter 260 and direct cleaned air through an evaporator 217 and a condenser 218 using electrical power. In one example, the condenser and the evaporator may be coiled and nested together allowing for greater surface area of both the evaporator and the condenser and increasing the efficiency of the extractor 290. In particular, the coiled configuration may allow greater amounts of air to be moved through the extractor 290, thereby increasing the output of condensation. The extractor 290 may be operated using energy derived from an electric machine 219, which may be an electric motor. During conditions when water levels in the reservoir 268 are low and increased water usage is required or anticipated over a drive cycle, water extractor 290 may be operated by drawing electrical energy from a vehicle high voltage battery (e.g., 48V battery) to generate water. Alternatively, the extractor 290 may draw power from another energy source on-board the vehicle, such as a battery, an alternator, or solar cells (such as battery 150, alternator 126, or solar cells 108 of FIG. 1). Condensation collected at the evaporator 217 is directed to one or more water processing components 262 including water collection valves, collection pumps, collection filters, etc. These components may be similar to those described earlier with reference to the HVAC system 208 and engine system 110. The collected water is then delivered along extracted water line 264 to the common reservoir 268. For example, water collected by the extractor 220 may be initially stored in one of a plurality of water reservoirs 168. The water may be treated and processed locally in the dedicated water reservoirs before being transferred into common water reservoir 268 where the water collected from the engine system is merged with water collected from the other sources.

Based on the source of the water as well as the intended use, the one or more engine water processing components coupled to each water line 224, 234, 244, 254, 264 may be distinct. For example, additional filters may be included in the surface water line in anticipation of more dirt particles in the water. As another example, additional water heating elements may be present in the extracted water line in anticipation of the extracted water being at a lower temperature. As yet another example, additional water cooling elements may be present in the engine water line in anticipation of the extracted water being at a higher temperature. As an example, when water is needed to suppress knock (based on mapping data or knock detection), the collected water may be pumped through a filter en-route to the engine. Alternatively, only water sourced from locations where there may be residual fuel mixed in with the water (such as water collected from the intake manifold or from a fuel system) may be used for in-cylinder injection to mitigate knock. As another example, water to be used for human consumption may be taken from a dedicated condenser and processed via a filter, ion-exchanger, and/or a distiller. Water used for engine cooling may be processed with only mesh filtering. Water used for cleaning vehicle cameras may originate from an HVAC system and may be processed with a mesh filter to avoid streaks or dirt spots.

Common reservoir 268 is fluidly connected to the various water lines (that is, water lines 224, 234, 244, 246, and 254) so as to collect water from the corresponding heat-exchangers and water sources. Common reservoir 268 may be located inside or outside of the vehicle cabin 204 and may include a water level sensor 266. In one example, common reservoir 268 is positioned at high point of the vehicle (wherein it is located at a higher altitude relative to other components of the water generation system) so to allow gravity feed to the point of use. This reduces the pump output required to deliver water from the reservoir to the various injectors and nozzles. The water level sensor 266 may be a float disposed within the reservoir which floats on accumulated water, or any other known sensor. In some embodiments, the common water reservoir 268 may also have a heating element configured to heat the accumulated water. When included, the heating element may be disposed within the water, or may be disposed in a wall of the reservoir. Water may also be pre-heated by one or more water processing components included in the water lines, such as via water heaters or heat exchangers coupled to the water lines. For example, water in engine line 234 may be preheated upon passage through or near engine 110. Likewise, when the water generation system includes multiple reservoirs, each may have a dedicated water level sensor.

Optionally, common water reservoir may include a temperature sensor 267 configured to provide a temperature of the accumulated water. When included, the temperature sensor 267 may be submerged in the water, may be in a wall of the reservoir, or may be part of the heating element. Together, the water level sensor 266 and the water temperature sensor 267 may relay information regarding water conditions to controller 190. For example, in freezing conditions, water temperature sensor 267 detects whether the water in reservoir 268 is frozen or available for dispensing. In some embodiments, an engine coolant passage (not shown) may be thermally coupled with common reservoir 268 to thaw frozen water. The level of water stored in reservoir 268, as identified by water level sensor 266, may be communicated to the vehicle operator and/or used to adjust vehicle operation. For example, a water gauge or indication on a vehicle instrument panel (not shown) may be used to communicate the level of water. If the level of water is higher than a threshold level, it may be inferred that there is sufficient water available for injection and spraying, and accordingly water injection may be enabled by the controller while limiting water extractor operation selectively to conditions when excess electrical energy is available. Else, if the level of water in the reservoir 268 is lower than the threshold level, it may be inferred that there is insufficient water available for injection, and therefore water generation may be actively enabled using electrical power from the vehicle's battery system. As elaborated at FIG. 3, water levels in a given reservoir may be estimated before and after each water generation event (where water is generated and stored in the given reservoir). Also, water levels in the given reservoir may be estimated before and after each water usage event (where water is drawn for use from the given reservoir). Based on a comparison of the water levels before and after the generation or usage event, the water generation system may be diagnosed. For example, if the estimated level changes by more than a threshold amount, water generation system leakage may be indicated Further, based on the water temperature, icing may be anticipated and the water may be purged. For example, responsive to water temperature in a given water reservoir falling below a first threshold, a water reservoir heater (e.g., coils, a PTC heater or Miralon heater) may be operated to raise the water temperature. In one example, where the vehicle is a PHEV, when the vehicle is plugged in to a wall outlet or inductive charging, the water reservoir may be to maintain the water temperature at or above the first threshold (e.g. at or above 40° F.). Responsive to water temperature in a given water reservoir falling below a second threshold, lower than the first threshold, water may be purged or discarded via a drain. For designs that leave the water in a hardened container and lines, the controller may also ensure that the water levels are maintained sufficiently below a maximum level to allow for expansion of ice in reservoirs and flow lines.

In some examples, one or more of the water reservoirs 230 may be further configured to retain water for a prolonged duration at above-freezing temperatures, independent of the ambient temperature. For example, the common water reservoir 268 may be configured as a vacuum insulated tank. In addition, the tank may be wrapped in engine coolant or a phase change material (PCM). Therein, channels may be provided that circulate the coolant or the phase change material around an outer surface of the water reservoir to cause a change in the phase of the material, storing the latent heat for later. The physical separation of the reservoir from the outside environment greatly reduces the transfer of cold temperatures through the vacuum wall to the reservoir. Further the tank is kept warm for an extended time until all the latent energy from material has been recovered followed its reversion to the original phase.

Still other sensors may be coupled to the water reservoir 268. For example, the quality of the water collected in the reservoir 268 may be assessed based on the output of a conductivity sensor coupled to the water reservoir. In other examples, the water quality may be sensed by a capacitance sensor, optical sensor, turbidity sensor, density sensor, or some other type of water quality sensor. Water reservoir 268 may further include a drain 270 including a drain valve to drain water from the reservoir to a location outside the vehicle (e.g., onto the road), such as when a quality of the water is deemed to be lower than a threshold and not suitable for injection into the engine (e.g., due to high conductivity or high particulate matter content).

Based on the intended use, one or more processing elements may also be coupled to common reservoir 268. For example, a heating element may be included to heat or boil the accumulated water. The boiling of the water may be done to remove additional impurities. A cooling element may also be included to cool the water after it has been boiled. Additionally, the heating and cooling elements may be used to maintain the accumulated water at a given temperature or within a defined temperature range.

The common reservoir 268 may be coupled to an outlet valve 272. The outlet valve 272 may be a three way valve, a proportioning valve, or other valve configuration. The outlet valve 272 may be actuated to allow the water to flow out of the reservoir 268 to distinct locations based on the intended use and the priority value of the water demand. For example, water may be dispensed along a first dispensing line 276 that extends from the outlet valve 272 to a first set of injectors, sprayers, and nozzles, such as engine water injectors, tire spray nozzles, brake spray nozzles, etc. In still further examples, distinct dispensing lines may be coupled to distinct injectors and nozzles. A second dispensing line 274 may extend from the outlet valve 272 to a potable water reservoir coupled inside the vehicle, such as inside a passenger compartment of the vehicle cabin.

In alternate examples, a single pump may pressurize the water from the reservoir to a water manifold that sends the water to the point of use. Use of a single pump may be economical. A check valve positioned between the pump and the reservoir may prevent pressurization of the reservoir. A single filter at the entrance to the water manifold may also be used. Each tap on the manifold may have a solenoid valve to allow to flow to each point of use. In further examples, a separate smaller filter may be coupled in line by each point of use. As each point of uses requires water, the solenoid valve may be commanded open for the required time based on pressure in the water manifold.

The water generation system 202 may also include a display 280 for displaying information about the water generation system 202 to a vehicle operator. Information may include data such as the water level in the reservoir(s), water temperature, whether the accumulated water has been purified, time elapsed since the accumulated water has been purified, water quality, etc. The display 280 may be located in a location visible to a user in the vehicle cabin 204.

Water generation system 202 may be communicatively coupled to vehicle controller 190. Based on input from the various sensors coupled to water generation system 202, as well as other sensors coupled to vehicle system 100 (such as those described with reference to FIG. 1), controller 190 may generate signals that are sent to the various actuators coupled to water generation system 202, as well as other actuators coupled to vehicle system 100 (such as those described with reference to FIG. 1). For example, based on input from an engine knock sensor, and further based on a water level in reservoir 268, the controller 190 may command an amount of water to be dispensed from the reservoir via outlet valve 272, the dispensed water then injected into the engine cylinder via a cylinder water injector. As another example, based on input from a vehicle speed sensor, the controller 190 may command an amount of water to be sprayed onto vehicle tires and/or vehicle brakes via a tire spray nozzle and/or a brake spray nozzle. As yet another example, based on a water level in reservoir 268, as well as a state of charge of a system battery, the controller may adjust the operation of the electric water generator for water generation.

In this way, the components of FIGS. 1-2 enable a vehicle system comprising: an engine including an intake manifold and a cylinder; a water harvesting system including an extractor for dehumidifying ambient air, a first collector for collecting condensate from the intake manifold, a second collector for collecting condensate from a vehicle air conditioning unit, a third collector for collecting condensate from channels provided on a vehicle surface, and a reservoir system including a plurality of reservoirs; a water level sensor coupled to each of the plurality of reservoirs of the reservoir system; a tire nozzle for spraying water on a vehicle tire; a brake nozzle for spraying water on a brake pad; an injector for injecting water directly into an engine cylinder; a vehicle speed sensor; and a controller with computer readable instructions that when executed causes the controller to: during an engine start, and before reaching idle speed, operate the water generation system to selectively collect condensate at the first collector; and inject condensate from a first of the plurality of reservoirs coupled to the first collector into the engine cylinder via the injector based on knock sensor output; and after reaching idle speed, operate the water generation system to selectively collect condensate at the second and third collector; and deliver condensate a second of the plurality of reservoirs via the tire nozzle when vehicle speed is higher than a threshold speed, and via the brake nozzle when vehicle speed is lower than the threshold speed. The controller includes further instructions for transferring the condensate from the first collector to the first reservoir via a first filter; and transferring the condensate from the second and the third collector to the second reservoir via a second filter, the first filter having a smaller mesh size than the second filter. The system may further comprise a pressure sensor coupled to a water line upstream of the first and the second filter, and the controller may be further configured to indicate water generation system leakage responsive to a lower than threshold pressure in the water line during the transferring of the condensate through the first or the second filter. Responsive to a longer than threshold duration of engine shut-down at lower than a threshold temperature prior to the engine start, the controller may open a drain valve to purge all water from the reservoir system. The controller includes further instructions for: responsive to operator request for potable water, transferring all water from the reservoir system to a distiller on-board the vehicle. The controller may also compare a water level in the reservoir system during the engine start, before operating the water generation system, to the water level in the reservoir system at an immediately preceding engine shut-down; and indicate leakage of the reservoir system responsive to a higher than threshold difference.

Figure 3:
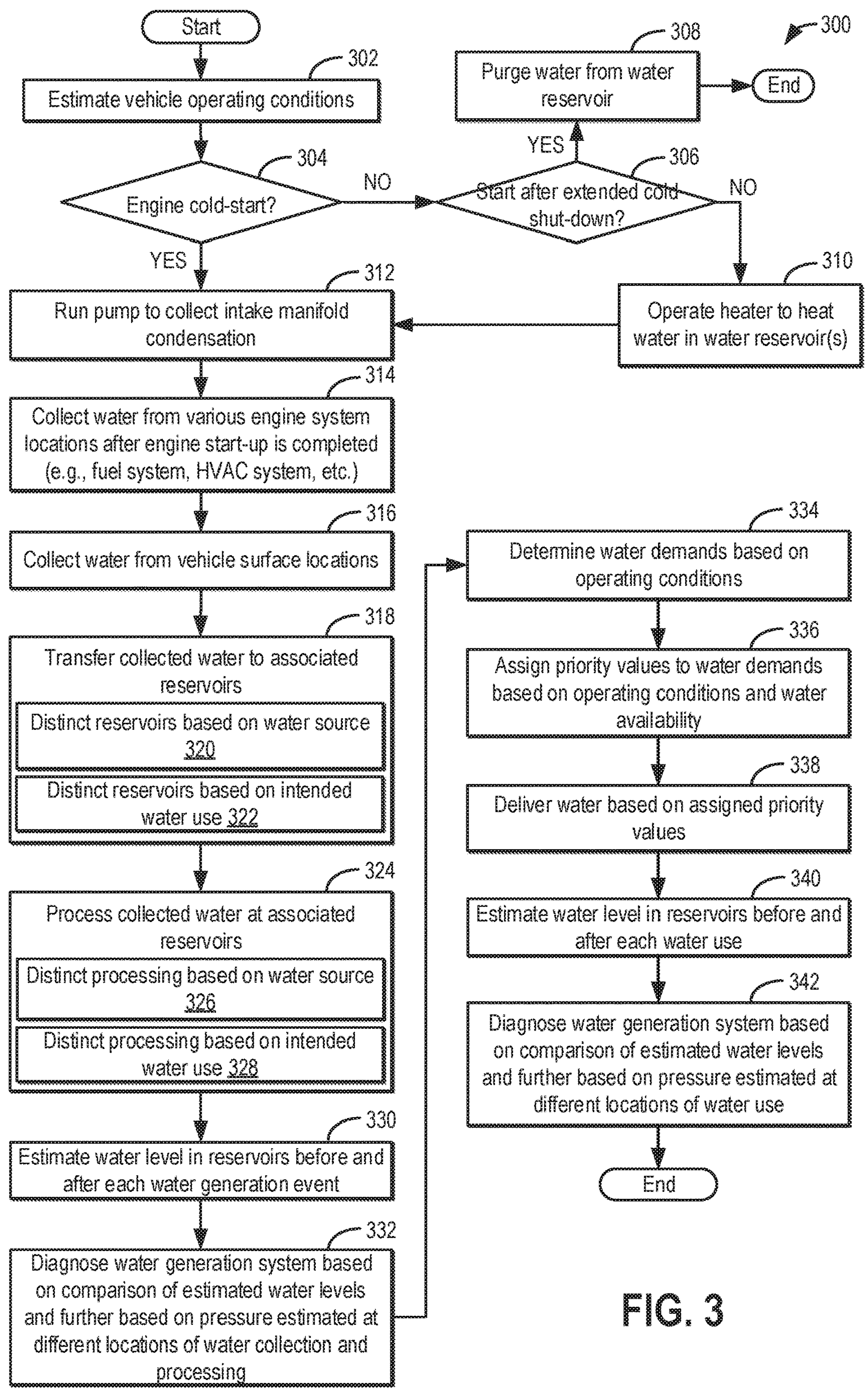
FIG. 3 shows a high level flow chart for harvesting water from different water sources on-board a vehicle and processing the water in different ways based on the intended water use.
Figure 4:
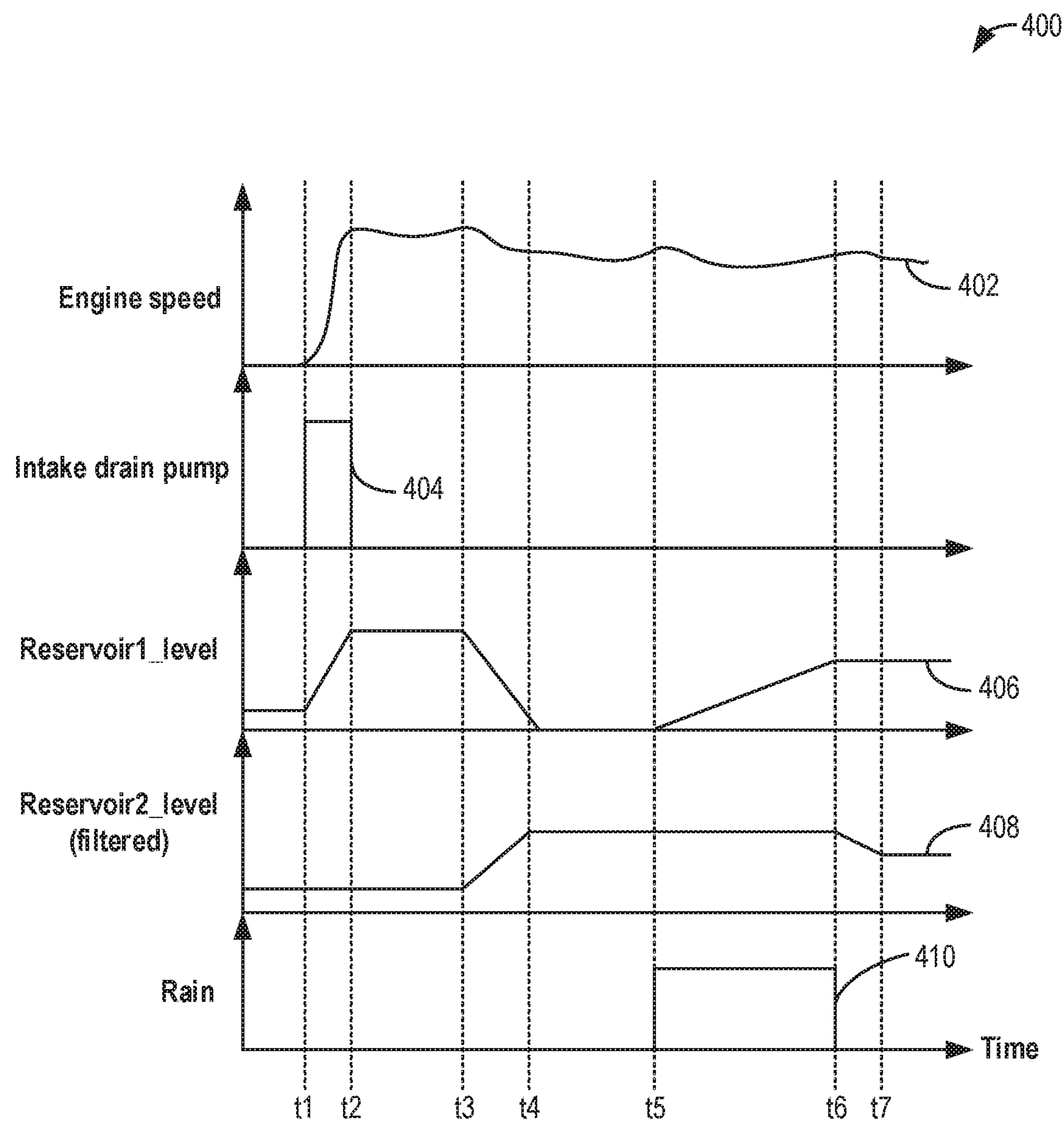
FIG. 4 shows a prophetic example of water collection, processing, and usage on-board a vehicle.

Turning now to FIG. 3, an example method 300 is shown for coordinating water collection, processing, and usage injection at a water generation system on-board a vehicle responsive to various vehicle operating conditions. The method enables vehicle performance to be improved by optimizing water usage. Instructions for carrying out method 300 and the rest of the methods included herein may be executed by a controller based on instructions stored on a memory of the controller and in conjunction with signals received from sensors of the vehicle system, such as the sensors described above with reference to FIGS. 1-2. The controller may employ engine actuators of the engine system to adjust engine operation, according to the methods described below.

At 302, the method includes estimating and/or measuring vehicle operating conditions. These may include engine operating conditions such as engine speed and load, driver torque demand, ambient conditions (ambient temperature and humidity, barometric pressure, etc.), boost pressure, MAP, MAF, engine temperature, catalyst temperature, etc. In addition, vehicle operating conditions including vehicle speed, battery state of charge, vehicle emissions level, navigational input regarding a route from a point of origin to a point of destination (such as route information, weather conditions along route, traffic conditions along route, etc.) may be determined. The navigational input may be retrieved from a navigational system (e.g., global positioning system or GPS) communicatively coupled to the vehicle controller and also communicatively coupled to an internet network, such as via wireless communication.

At 304, the method includes determining if there is an engine cold-start. In one example, where the vehicle is a hybrid vehicle, an engine may be started responsive to an increase in driver demanded torque that cannot be met by an electric motor of the vehicle's driveline (such as due to battery SOC limitations). In a conventional vehicle, the engine may be started responsive to an operator torque demand. In each case where the engine is started, it may be further determined if the ambient temperature is lower than a threshold temperature (such as below 35° F.). If an engine cold-start is not confirmed, at 306, it may be determined if the engine is being started after an extended cold shut-down. For example, it may be determined if the engine was shutdown (prior to the given start) for longer than a threshold duration. The threshold duration may be a function of the ambient temperature, the threshold duration reduced as the ambient temperature decreases. If an extended cold shutdown is confirmed, than at 308, the method includes purging water from the water reservoir(s) of the water generation system to avoid freezing water in the water lines. If not purged, the frozen water could result in damage to the water tank and lines. Water may be purged from all water reservoirs of the water generation system or from a subset of all the water reservoirs. The method then exits.

If an extended cold shut-down is not confirmed (but an engine cold-start is confirmed), then at 310, the method includes operating a heater to heat the water in the reservoir (s). For example, the controller may send a command signal to in-tank electric heaters to operate for a duration, a duty cycle commanded to the heaters determined as a function of the water temperature and the ambient temperature. In other examples, a pump may be operated to pump hot coolant or a phase change material around an outer surface of the water reservoir to raise the water temperature. Heating may be performed until the water temperature is above a threshold temperature, such as at or above 40° F. From 310, the method moves to 312. It will be appreciated that while the present example assesses the water temperature at the engine start, in other examples, while the engine is shutdown, the controller may be woken up every couple of hours to assess the water temperature, and purge the stored water is freezing is anticipated.

If an engine cold start is confirmed, at 312, the method includes operating a pump to collect condensation that collects in the intake manifold during an engine cold-start. Water condenses in the intake manifold after a soak. The water collects at the bottom of the manifold. Upon start-up or just before engine fueling is resumed (such as while engine speed is less than 50 rpm), the water is pumped out by a tube leading to a reservoir dedicated to injection into the engine. Since fuel can be present in the manifold, a fraction of this water may have fuel mixed with it. Therefore, this water is only used for injection into the engine.

At 314, after engine start-up is completed, water is harvested from various other engine system locations. For example, water may be harvested from an HVAC system during operation of an air conditioning unit for vehicle cabin temperature control. As another example, water may be harvested from fuel cell operation. As yet another example, water may be harvested from engine cylinders during combustion, from a CAC during boosted engine operation, and from an EGR cooler during engine operation with EGR. At 316, water may be collected from vehicle surface locations. For example, condensate may be collected from the vehicle's surface via channels coupling the surface of the vehicle to a water reservoir. In addition, precipitation, such as in the form of rain or snow, may be collected via the channels. Optionally, water may also be generated by operating a water extractor that dehumidifies ambient air to generate water. Therein, the water extractor may be operated using electrical power from a system battery. In one example, the water extractor may be selectively operated when a water level in a central reservoir falls below a threshold so as to ensure that there is sufficient water available to meet any water demands. In some examples, the threshold may be adjusted in real-time as the current water demand changes. Further, a water demand over the drive cycle may be predicted and the water extractor may be operated based on the predicted water demand, while accounting for the other sources of water (including the engine and vehicle surface locations). Water may also be recovered from the rain channels on the roof of the car. A prediction of no rain for an extended time may trigger extraction from air sooner than when rain is predicted.

In still further examples, such as where the vehicle is configured with the autonomous driving capabilities, a vehicle controller may adjust a route of vehicle travel to increase water collection from the vehicle surface responsive to a remote request and/or other conditions. For example, responsive to water levels in the reservoir being lower, the controller may select a navigational route from a point of origin to a point of destination based on weather data (received from a GPS system). This may include driving the vehicle through areas of increased precipitation (such as areas where there is rain or snow) when the water level in the reservoir is lower than a non-zero positive threshold so as to collect the rain via the channels on the vehicle's surface. As another example, when the water levels in the reservoir are lower than the threshold, the autonomous vehicle may be driven through areas having higher ambient humidity so that the moisture in the air can be captured via operation of the water extractor, while still reaching the destination within a desired arrival time specified by a passenger or via a remote request.

At 318, the method includes transferring the collected water to a reservoir. In one example, at 320, water from the different sources may be stored on distinct water reservoirs. For example, water harvested from the HVAC system may be stored in a first reservoir while water collected from the vehicle's surface is stored in a second, different reservoir. Likewise, water generated by the water extractor or collected from the engine locations may be stored in distinct reservoirs. This is because the water from each of the sources may have distinct water qualities. For example, water sourced from the intake manifold or the fuel system may have at least some fuel contamination mixed in with the water. As another example, water collected from the vehicle surface may have higher levels of particulates and/or a lower pH than water generated by the extractor. Additionally or alternatively, water from the different sources may be transferred to distinct reservoirs based on their intended use. For example, water collected from the intake manifold and the fuel system may be transferred to a first reservoir from where water is sourced for injecting directly into an engine cylinder during knock control. This allows the water that has potential fuel contamination to only be used in locations where the fuel contamination will not have a negative effect. As another example, water collected from the vehicle surface locations may be transferred to a second reservoir from where water is sourced for spraying onto a tire surface, a brake pad, a windshield, a cylinder head, or for other cleaning or surface cooling purposes. As yet another example, water generated by the extractor may be transferred to a reservoir for generating potable water. In still other examples, water collected from all the sources (or a subset of all the sources) may be transferred via piping to a common (or central) water reservoir. Water may be recovered from internal spillage from a potable dispenser system. In some cases where multiple reservoirs are maintained, water stored for potable use may be diverted to other uses, such as coolant top-off. However, the less clean sources of water may not be diverted to use as potable water.

At 324, the method includes processing the collected water at the associated reservoirs. The processing improves the usability of the collected water. This includes, at 326, processing the water differently based on the distinct water source. For example, water collected from vehicle surfaces may be subject to filtering through a mesh having a smaller pore size to remove the higher level of particulates expected in the water while water collected from engine locations may be subject to filtering through a mesh having a larger pore size. As another example, water generated via the water extractor may be filtered, ion-exchanged, and distilled. The processing may additionally or optionally include, at 328, processing the water differently based on the intended use. For example, water intended for potable use may be filtered, ion-exchanged, and distilled, while water intended for spraying on component surfaces for particulate suppression or cooling may be minimally filtered. As another example, water intended to be injected into a cylinder for knock control may be filtered to a higher degree to reduce combustion stability issues from injection of poor quality water. Water intended for use to clean camera lenses may have a fine mesh to avoid particles being left on the lenses. Alternately, distilled water may be used for the lenses to avoid mineral build-up.

At 330, the method includes estimating and comparing a water level in each reservoir before and after each water generation event. For example, an output of a water level sensor coupled to a given water reservoir may be noted before and after each water generation event. As an example, the water level of a water reservoir coupled to the water extractor may be noted before and after operating the water extractor. In alternate examples, a water level may be estimated at each reservoir upon a vehicle shut-down, and then again at a time of an immediately subsequent vehicle start-up (with no vehicle operation in between).

At 332, the method includes diagnosing the water generation system based on a comparison of the estimated water levels and further based on pressure estimated at different locations of water collection and processing. With reference to the earlier example, based on the ambient humidity and further based on a duration (and power setting) of operating the water extractor, the controller may predict an expected amount of water that was harnessed in a reservoir associated with the water extractor. By adding this amount to the water level in the reservoir sensed before the water generation, the controller may be able to predict an expected water level in the reservoir after the generation. If the actual water level sensed after the water generation is lower than the predicted amount by more than a threshold amount, it may be inferred that there is water generation system degradation. For example, it may be inferred that there is a system leak, such as in the associated water reservoir. Alternatively, it may be inferred that the water extractor did not function as expected to. In still another example, if the water level estimated at the time of vehicle start-up changes from the water level estimated at the time of the immediately preceding vehicle shut-down, it may be inferred that the water generation system has a leak. A vehicle operator may be notified about the leakage by illuminating an indicator.

In still other examples, the output of pressure sensors coupled to different locations of the water generation system may be used to diagnose the water generation system. For example, while processing water from a reservoir through a filter, a pressure may be measured upstream of the filter. If the sensed pressure exceeds a threshold, the controller may illuminate a light that indicates that the filter needs to be changed. Else, if the pressure is below the threshold, the controller may illuminate a system leakage indicator. If a water source is supplying water to a windshield washer system, the use of the system should trigger the rain detection system. Else, if the detection is not triggered after multiple attempts, the controller may illuminate a failure to deliver water spray.

Next, at 334, the method includes determining the different water demands of the vehicle. For example, based on the operating conditions, the vehicle controller may estimate respective amounts of water to inject (e.g., directly into an engine cylinder) for engine knock control, for providing a desired level of engine dilution (e.g., into an intake manifold), for cylinder temperature control, for exhaust temperature or composition control, etc. Water may be injected into the engine responsive to knock wherein the charge cooling from the water provides knock relief, thereby reducing the reliance on spark retard for knock control. Likewise, water may be injected into the engine manifold to provide a desired engine dilution, reducing the need for EGR. Further, water may be injected into the engine responsive to elevated exhaust temperatures wherein the charge cooling from the water enables exhaust temperature control, reducing the need for enrichment of the air/fuel ratio. The controller may also determine other water demands such as the amount of water required to be sprayed onto a cylinder head for cylinder head temperature control, onto tires for tire particulate control, or onto brake pads for brake particulate control. Further still, water demand for wiper usage may be determined. As yet another example, water demand for refilling various fluids, such as wiper fluid or coolant fluid, in their respective tanks, may be determined.

In one example, the water usage may be based on current vehicle and engine operating conditions, as well as based on predicted operating conditions over the given drive cycle. The prediction may be based at least on navigational input received at the controller from a navigational system, such as a GPS. The navigational input may include, for example, traffic information along a planned route of travel from a current point of origin to a selected point of destination. Navigational input may further include weather information along the route and at the destination, road conditions (e.g., road grade, road temperature, presence of potholes or other obstructions), ambient conditions (such as humidity or altitude), distance to closest fuel refilling stations or electric charging stations, etc. As an example, during vehicle travel through a dry area or at high altitude, increased water usage for knock control may be predicted. As another example, during vehicle travel down a mountain, increased water usage for spraying onto tires and brake pads may be anticipated.

At 336, the method includes assigning a priority value to each of the water demands (and the corresponding water injection amounts) based on operating conditions as well as water availability. The assigned priority values may be further based on the source of the water as well as operator input. The assigned priority values may also be determined based on the current water supply (e.g., in relation to a predicted future water supply over the drive cycle). A first set of priority values may be assigned when the predicted water level is determined to be higher than the current water level, indicating that water is currently limited but more water is expected to be available in the future part of the drive cycle (or over the next several drive cycles). A second, different set of priority values may be assigned when the current water level is determined to be higher than the predicted water level, indicating that water is currently amply available but water availability is expected to become limited in the future part of the drive cycle (or water may run out in the next several drive cycles). The assigned priority values may also be adjusted as a function of vehicle operating conditions. For example, when water availability is limited, water may be first provided for cylinder temperature control before it is provided for particulate control. Identification of, and presence in, an urban "particulate green zone" may cause the priority of brake and tires particulate suppression to be increased (e.g., to rise to the top priority) until the vehicle passes out of the green zone. This zone would be identified by GPS coordinates or by a locally broadcast signal based on local PM detectors. Even within water injection for PM control, the water injection order may be adjusted based on the age of the brake pads and the tires. For example, brake pads may release more PMs when they are initially installed. Thus, more water may be injected onto the brake location (relative to the tire location) when the brake pads' age is lower than a threshold. Then, as the brake pads age, more water may be injected onto the tire location relative to the brake location for PM control.

As yet another example, the assigning of priority values and the order of water injection may be adjusted based on tire temperature, which may be a function of road/asphalt temperature, or vehicle speed. As sun loading on a road increases, the road temperature may increase, increasing the temperature of tires driven on the road. Therefore as the ground temperature increases, more water may be injected onto the tire location relative to the brake location for PM control to offset increased evaporation. Likewise, as vehicle speed increases, the tire temperature may rise, and more water may be injected onto the tire location relative to the brake location for PM control. In another example, when a vehicle deceleration event occurs, more water may be injected onto the brake location relative to the tire location for PM control. Below a lower threshold vehicle speed (such as 3 mph or lower), water spraying onto both the tires and the brakes may be disabled to conserve water for other uses.

In a further example, the assigning of priority values may be affected by operator input. For example, if the operator provides input indicating that they wish to use the water for drinking purposes, more of the water may be directed towards processing to make potable water, and less water may be directed towards the brakes and the tires, or the cylinder head.

As still another example, the assigning of priority values may be affected by the source of the water, such as based on whether water was collected from an HVAC system, from ambient air, from a vehicle surface, etc. For example, if a larger portion (e.g., all) of the available water is collected from the vehicle surface, there may be dirt and particulate matter included therein, and so water usage for cylinder head cooling may be assigned a higher priority value as compared to water usage for PM control. In comparison, if a larger portion (e.g., all) of the available water is collected from the HVAC system, water usage for cylinder head cooling may be assigned a lower priority value as compared to water usage for PM control. If low coolant level is detected, the replenishment of the coolant level to a minimum threshold may become top priority and be assigned a higher weightage.

The assigning of priority values enables the fuel economy and performance benefits of the limited water supply to be maximized by using the water during conditions that create a higher efficiency benefit per unit of water while stopping or reducing water usage during conditions that create a lower efficiency benefit per unit of water. The different priority values may affect the order in which the different amounts of water are dispensed in the vehicle.

Optionally, the adjusting of the assigned priority values may be further based on an estimated quality of water in the reservoir. This may include determining whether to enable or disable water delivery, as well as adjusting the water injection priority values based on the estimated water quality. As such, the nature of contaminants present in the water, as well as the degree of contamination may vary widely based on the water source, as well as based on a percentage of the total water in the reservoir that was generated or harvested on-board the vehicle from a contaminated sourced. For example, water collected from a vehicle surface may have a higher degree of contamination than water collected from an HVAC system. The quality of the water in the water reservoir may be estimated based on the output of a water quality sensor coupled to the water reservoir, the water quality estimate based on a conductivity value or ionic strength of the water (such as sensed via a conductivity sensor). In alternate examples, the quality of the water may be estimated based on an ionic strength of the water, a particle matter content, a turbidity sensor, a density sensor, a refraction index, etc.

As an example, the estimated water quality (e.g., the index value or rating number or conductivity value) may be compared to a threshold which depends on the water quality sensor being used. For example, a lower reading on a turbidity sensor may be given a high water quality index value, and turbidity readings of less than 5 NTU may correspond to water quality index values higher than the threshold. The threshold may correspond to a minimum water quality level required to enable water usage without compromising vehicle performance or engine combustion characteristics. In some examples, a common threshold may be applied for all water injection events. In other examples, distinct thresholds may be applied for water injection responsive to knock as compared to water delivery for engine temperature control, or for PM control because deposit forming tendency may depend on component temperatures or other factors which are highly correlated to the various usage conditions. In some examples, the estimated water quality may be compared to each of a lower threshold below which water injection may always be disabled, and an upper threshold above which water injection may always be enabled. In between the upper and lower threshold, water injection may be limited, for example, an operating window where water injection is permissible may be limited or varied, which may affect the assigned priority value of water injection. For example, when the water quality is lower, water delivery responsive to PM levels may be enabled in a broader engine speed-load regions including regions where elevated engine temperatures are anticipated (even before they are actually detected).

At 338, the method includes scheduling the water usage based on the assigned priority values with the water demand having the highest priority value being met first. In particular, the controller may inject or spray the determined amounts of water corresponding to the different water demands to their corresponding location in an order based on the assigned priority values. Based on the water demand amount and location, the corresponding injector or spray nozzle may be actuated. For example, the controller may send a pulse-width signal to the corresponding water injector or spray nozzle to deliver the selected amount of water into the selected location while maintaining the remaining water injectors disabled. In one example, when water is to be injected for knock control, the controller may actuate a direct water injector coupled to an engine cylinder and send a pulse-width signal corresponding to the knock control amount to the direct water injector. In another example, when water is to be injected for engine temperature control, the controller may actuate a cylinder head water nozzle coupled to an engine cylinder head and send a pulse-width signal corresponding to the temperature control amount to the water nozzle.

At 340, the method includes estimating and comparing a water level in each reservoir before and after each water usage event. For example, an output of a water level sensor coupled to a given water reservoir may be noted before and after each water usage event.

At 342, the method includes diagnosing the water generation system based on a comparison of the estimated water levels and further based on pressure estimated at different locations of water usage and processing. For example, based on a duration of operation and a duty cycle commanded to a water nozzle, the controller may predict an expected amount of water that was drawn from a reservoir. By subtracting this amount from the water level in the reservoir sensed before the water usage, the controller may be able to predict an expected water level in the reservoir after the usage. If the actual water level sensed after the water usage is lower than the predicted amount by more than a threshold amount, it may be inferred that there is water generation system degradation. For example, it may be inferred that there is a system leak, such as in the associated water reservoir. Alternatively, it may be inferred that the water nozzle is leaking. A vehicle operator may be notified about the leakage by illuminating an indicator. If water is transferred from one reservoir to another, the decrease in volume level indication from the first reservoir is confirmed to become an increase in the second reservoir's indicated level. Two way transfer can serve as a diagnostics of the level sensor, in case a one way transfer did not register a correct transfer of volume.

In still other examples, the output of pressure sensors coupled to different locations of the water generation system may be used to diagnose the water generation system. For example, while drawing water from a reservoir through a filter, a pressure may be measured upstream of the filter. If the sensed pressure exceeds a threshold, the controller may illuminate a light that indicates that the filter needs to be changed. Else, if the pressure is below the threshold, the controller may illuminate a system leakage indicator. If water source is supplying water to a windshield washer system, the use of the system should trigger the rain detection system. Else, if the detection is not triggered after multiple attempts, the controller may illuminate a failure to deliver water spray.

Turning now to FIG. 4, an example of water collection, processing, and usage on-board a vehicle is shown. Map 400 depicts engine speed at plot 402. Operation of an intake drain pump is shown at plot 404. The water level in a first water reservoir (wherein water is initially collected) is shown at plot 406. The water level in a second water reservoir (wherein water is transferred from the first reservoir after processing via a filter) is shown at plot 408. Precipitation on the vehicle (in the form of rain) is depicted at plot 410. All plots are shown over time along the x-axis.

Prior to t1, the engine is shutdown. The intake drain pump of the vehicle is not operated. Water levels in the first and second reservoir remain constant as water is neither being collected nor being used.

At t1, the engine is started after a long shut-down responsive to an operator torque demand. The engine is started by initially cranking the engine via a starter motor and then resuming engine fueling. Due to the extended soak prior to the engine being started, condensation is expected to collect in the engine's intake manifold. Accordingly, between t1 and t2, while the engine speed is below a threshold speed (for example, below 50 rpm), an intake drain pump is operated. The drain pump is coupled to a bottom of the intake manifold and is configured to pump out condensate collected in the intake manifold, and transfer it to the first reservoir. Therefore, between t1 and t2, as the pump operates, the water level in the first reservoir starts to rise. At t2, the intake manifold pump is stopped. The engine is running fueled at this time. Water is not being used on-board the vehicle and so the water levels in the reservoir remain constant.

At t3, water is pumped from the first reservoir to the second reservoir via a filter. The transfer and processing of water between t3 and t4 results in a drop in the water level in the first reservoir and a corresponding rise in the water level in the second reservoir.

At t5, rain occurs. The rain is collected via channels coupled to the vehicle's surface, and the collected rain water is drained into the first reservoir, resulting in a rise in the water level at the first reservoir.

Between t6 and t7, a windshield washer nozzle is operated which sprays water drawn from the second reservoir into the windshield. This results in a drop in the water level in the second reservoir. After t7, water usage is terminated.

In this way, water usage, water collection, water processing on-board a vehicle can be optimized and coordinated. By collecting water condensing at various locations of an engine during an engine start as well as during engine operation (including boosted engine operation), water collection opportunities are extended over an entire drive cycle. By collecting the water into distinct reservoirs, and then processing the water of the different reservoirs distinctly, based on source and/or intended use, water properties can be customized. By applying a higher degree of processing to only a subset of all the collected water, based on the source or intended use, the need to process all the water is averted. This allows for component and cost benefits in addition to improving fuel economy. In addition, component life is extended. By varying an order of water usage based on water availability, water quality, and operating conditions, the efficiency per unit of water generated and used is improved. By improving water usage, vehicle performance is improved.

One example method for a vehicle comprises: selectively operating a pump during an engine start to draw condensate from an intake manifold into a water reservoir of a water generation system on-board the vehicle. In the preceding example, additionally or optionally, the selectively operating includes operating during an engine start after a longer than threshold engine soak, the pump operated while engine speed is lower than a threshold speed and before resuming fuel delivery to the engine during the engine start. In any or all of the preceding examples, additionally or optionally, the selectively operating further includes, responsive to ambient temperature being below a threshold temperature during the longer than threshold engine soak, purging water from the reservoir. In any or all of the preceding examples, additionally or optionally, the water reservoir is vacuum insulated, the method further comprising, circulating one of a coolant and a phase change material around the water reservoir. In any or all of the preceding examples, additionally or optionally, the water reservoir is a first reservoir, the method further comprising, after the engine start, collecting AC condensate from an air-conditioning unit of the vehicle, the AC condensate stored in a second, different reservoir. In any or all of the preceding examples, additionally or optionally, the method further comprises: processing the condensate from the intake manifold via a higher degree of filtering; and processing the AC condensate via a lower degree of filtering. In any or all of the preceding examples, additionally or optionally, the method further comprises: delivering the condensate from the intake manifold to a first vehicle location while delivering the AC condensate to a second, different vehicle location. In any or all of the preceding examples, additionally or optionally, the first vehicle location includes directly into an engine cylinder, and wherein the second location includes onto a tire surface. In any or all of the preceding examples, additionally or optionally, the condensate from the intake manifold is delivered to the first location responsive to a first vehicle operating condition, and wherein the AC condensate is delivered to the second location responsive to a second, different vehicle operating condition. In any or all of the preceding examples, additionally or optionally, the first vehicle operating condition includes a higher than threshold output from an engine knock sensor, and wherein the second vehicle operating condition includes a higher than threshold vehicle speed.

Another example method for a vehicle comprises: collecting water, harvested from a first vehicle component when operating an engine at a first vehicle speed, at a first reservoir; collecting water, harvested from a second, different vehicle component when operating the engine at a second, different vehicle speed, at a second reservoir; and processing the water from the first reservoir differently than the water from the second reservoir before delivering the water to a vehicle location. In any or all of the preceding examples, additionally or optionally, the collecting from the first vehicle component includes collecting condensate from the first vehicle component passively, and wherein the collecting from the second vehicle component includes collecting condensate from the second vehicle component actively via operation of a pump. In any or all of the preceding examples, additionally or optionally, the method further comprises: delivering water from the first reservoir to a first vehicle location responsive to a first vehicle operating condition; and delivering water from the second reservoir to a second, different vehicle location responsive to a second, different vehicle operating condition. In any or all of the preceding examples, additionally or optionally, the first vehicle location includes onto a tire or brake surface, and wherein the second vehicle location includes into an engine cylinder, wherein the first vehicle component includes one of an intake manifold a charge air cooler, and wherein the second vehicle component includes one of an air-conditioning unit and an electric air dehumidifier.

An example vehicle system comprises: an engine including an intake manifold and a cylinder; a water harvesting system including an extractor for dehumidifying ambient air, a first collector for collecting condensate from the intake manifold, a second collector for collecting condensate from a vehicle air conditioning unit, a third collector for collecting condensate from channels provided on a vehicle surface, and a reservoir system including a plurality of reservoirs; a water level sensor coupled to each of the plurality of reservoirs of the reservoir system; a tire nozzle for spraying water on a vehicle tire; a brake nozzle for spraying water on a brake pad; an injector for injecting water directly into an engine cylinder; a vehicle speed sensor; and a controller with computer readable instructions that when executed causes the controller to: during an engine start, and before reaching idle speed, operate the water generation system to selectively collect condensate at the first collector; and inject condensate from a first of the plurality of reservoirs coupled to the first collector into the engine cylinder via the injector based on knock sensor output; and after reaching idle speed, operate the water generation system to selectively collect condensate at the second and third collector; and deliver condensate a second of the plurality of reservoirs via the tire nozzle when vehicle speed is higher than a threshold speed, and via the brake nozzle when vehicle speed is lower than the threshold speed. In any or all of the preceding examples, additionally or optionally, the controller includes further instructions for: transferring the condensate from the first collector to the first reservoir via a first filter; and transferring the condensate from the second and the third collector to the second reservoir via a second filter, the first filter having a smaller mesh size than the second filter. In any or all of the preceding examples, additionally or optionally, the system further comprises a pressure sensor coupled to a water line upstream of the first and the second filter, wherein the controller includes further instructions that when executed cause the controller to indicate water generation system leakage responsive to a lower than threshold pressure in the water line during the transferring of the condensate through the first or the second filter. In any or all of the preceding examples, additionally or optionally, the controller includes further instructions for: responsive to a longer than threshold duration of engine shut-down at lower than a threshold temperature prior to the engine start, opening a drain valve to purge all water from the reservoir system. In any or all of the preceding examples, additionally or optionally, the controller includes further instructions for: responsive to operator request for potable water, transferring all water from the reservoir system to a distiller on-board the vehicle. In any or all of the preceding examples, additionally or optionally, the controller includes further instructions for: comparing a water level in the reservoir system during the engine start, before operating the water generation system, to the water level in the reservoir system at an immediately preceding engine shut-down; and indicating leakage of the reservoir system responsive to a higher than threshold difference.

In a further representation, the vehicle system is a hybrid vehicle system. In yet another representation, the vehicle is configured with autonomous driving capabilities. In the preceding example, a navigational route of the autonomous vehicle is adjusted by a vehicle controller based on water level in a water reservoir on-board the vehicle and further based on weather data received from a navigational system. In the preceding example, the adjusting includes routing the autonomous vehicle through an area having precipitation (e.g., rain) responsive to a lower than threshold water level in the water reservoir.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, comprising:

operating a pump during an engine start, including:

before reaching an idle speed of an engine, operating the pump to draw condensate from an intake manifold into a water reservoir of a water generation system on-board the vehicle, and injecting condensate from the water reservoir into an engine cylinder based on a knock sensor output; and after reaching the idle speed of the engine, operating the pump to draw condensate from an air-conditioning unit of the vehicle.

2. The method of claim 1, wherein the operating includes operating during an engine start after a longer than threshold engine soak.

3. The method of claim 2, wherein the operating further includes, responsive to ambient temperature being below a threshold temperature during the longer than threshold engine soak, purging water from the water reservoir.

4. The method of claim 1, wherein the water reservoir is a first reservoir, the method further comprising, after reaching idle speed, collecting the condensate from the air-conditioning unit into a second, different reservoir.

5. The method of claim 4, further comprising:

processing the condensate from the intake manifold via a higher degree of filtering; and processing the condensate from the air-conditioning unit via a lower degree of filtering.

6. The method of claim 4, further comprising:

delivering the condensate from the intake manifold to a first vehicle location while delivering the condensate from the air-conditioning unit to a second, different vehicle location.

7. The method of claim 6, wherein the first vehicle location includes directly into an engine cylinder, and wherein the second vehicle location includes onto a tire surface.

8. The method of claim 5, wherein the condensate from the air-conditioning unit is delivered to the second vehicle location responsive to a higher than threshold vehicle speed.

9. A vehicle system, comprising:

an engine including an intake manifold and a cylinder;

a water generation system including an extractor for dehumidifying ambient air, a first collector for collecting condensate from the intake manifold, a second collector for collecting condensate from a vehicle air conditioning unit, a third collector for collecting condensate from channels provided on a vehicle surface, and a reservoir system including a plurality of reservoirs;

a plurality of water level sensors coupled to each of the plurality of reservoirs of the reservoir system;

a tire nozzle for spraying water on a vehicle tire;

a brake nozzle for spraying water on a brake pad;

an injector for injecting water directly into an engine cylinder;

a vehicle speed sensor; and a controller with computer readable instructions that, when executed, cause the controller to:

during an engine start, and before reaching an idle speed of the engine, operate the water generation system to selectively collect condensate at the first collector; and inject condensate from a first of the plurality of reservoirs coupled to the first collector into the engine cylinder via the injector based on a knock sensor output; and after reaching the idle speed of the engine, operate the water generation system to selectively collect condensate at the second and third collectors; and deliver condensate from a second of the plurality of reservoirs via the tire nozzle when vehicle speed is higher than a threshold speed, and via the brake nozzle when vehicle speed is lower than the threshold speed.

10. The system of claim 9, wherein the controller includes further instructions for:

transferring the condensate from the first collector to the first reservoir via a first filter; and transferring the condensate from the second and third collectors to the second reservoir via a second filter, the first filter having a smaller mesh size than the second filter.

11. The system of claim 10, further comprising a pressure sensor coupled to a water line upstream of the first and second filters, wherein the controller includes further instructions that, when executed, cause the controller to indicate water generation system leakage responsive to a lower than threshold pressure in the water line during the transferring of the condensate through the first filter or the second filter.

12. The system of claim 9, wherein the controller includes further instructions for:

responsive to a longer than threshold duration of engine shut-down at a temperature lower than a threshold temperature prior to the engine start, opening a drain valve to purge all water from the reservoir system; and responsive to an operator request for potable water, transferring all water from the reservoir system to a distiller on-board the vehicle.

13. The system of claim 9, wherein the controller includes further instructions for:

comparing a water level in the reservoir system during the engine start, before operating the water generation system, to the water level in the reservoir system immediately preceding engine shut-down; and indicating leakage of the reservoir system responsive to a higher than threshold difference.

14. The system of claim 9, wherein the controller includes further instructions for:

driving the vehicle autonomously along a route from an operator selected point of origin to an operator selected point of destination; and selecting the route based on an output of a water level sensor coupled to the first reservoir and further based on weather data from a navigational system, the selecting including routing the vehicle through an area with precipitation responsive to a lower than threshold output of the water level sensor.

* * * * *